United States Patent
Arimura

(10) Patent No.: US 8,043,769 B2
(45) Date of Patent: Oct. 25, 2011

(54) DIRECT METHANOL FUEL CELL

(75) Inventor: Tomoaki Arimura, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/782,522

(22) Filed: May 18, 2010

(65) Prior Publication Data

US 2010/0297536 A1    Nov. 25, 2010

(30) Foreign Application Priority Data

May 20, 2009   (JP) .................. 2009-122326

(51) Int. Cl.
H01M 4/02    (2006.01)
H01M 4/36    (2006.01)

(52) U.S. Cl. .................. 429/530; 429/506; 429/523

(58) Field of Classification Search .................. 429/530, 429/506, 523
See application file for complete search history.

(56) References Cited

U.S. PATENT DOCUMENTS 3,847,672 A    11/1974   Trocciola et al.

FOREIGN PATENT DOCUMENTS

| JP | 4-094061 | 3/1992 |
|----|----------|--------|
| JP | 2004-234947 | 8/2004 |
| JP | 2004234947 A | * 8/2004 |
| JP | 2005-044664 | 2/2005 |
| JP | 2007-311057 | 11/2007 |

OTHER PUBLICATIONS

Japanese Patent Application No. 2009-122326; Notification of Reasons for Rejection; mailed Dec. 7, 2010 (English translation).
Japanese Patent Application No. 2009-122326; Notification of Reasons for Rejection; mailed Aug. 31, 2010 (English translation).

* cited by examiner

*Primary Examiner* — Jennifer K. Michener
*Assistant Examiner* — Heng Chan
(74) *Attorney, Agent, or Firm* — Blakely, Sokoloff, Taylor & Zafman LLP

(57) ABSTRACT

According to one embodiment, a direct methanol fuel cell includes an anode having a current collector and a catalyst layer formed on the current collector, a cathode having a current collector and a catalyst layer formed on the current collector, and an electrolyte membrane placed between the catalyst layers of the anode and the cathode. The anode-side catalyst layer includes a catalyst and a sheet-like organic compound consisting of a plurality of molecules having an aliphatic cyclic skeleton in which two carbon atoms are bonded to a cationic functional group and an anionic functional group, respectively. The sheet-like organic compound has a layered branch structure in which the molecules are layered by bonding different ions of the aliphatic cyclic skeleton to one another so that the molecules are displaced from one another, and a plurality of units each having the layered branch structure are present in the catalyst layer.

2 Claims, 3 Drawing Sheets

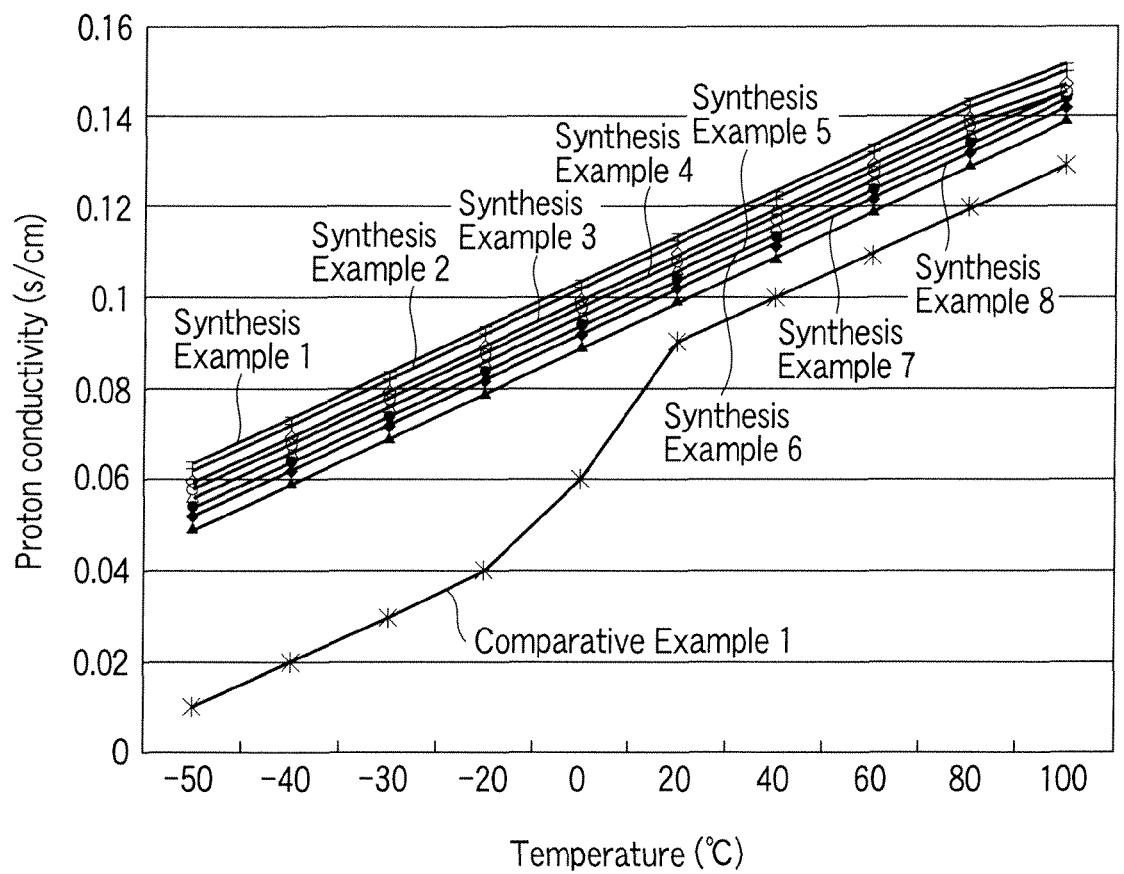
F I G. 3

DIRECT METHANOL FUEL CELL

CROSS-REFERENCE TO RELATED APPLICATIONS

This application is based upon and claims the benefit of priority from Japanese Patent Application No. 2009-122326, filed May 20, 2009, the entire contents of which are incorporated herein by reference.

FIELD

Embodiments described herein relate generally to a direct methanol fuel cell.

BACKGROUND

A direct methanol fuel cell includes an anode to which an aqueous methanol solution is fed as a fuel, a cathode to which an oxidant is fed, and a proton conducting membrane placed between the anode and the cathode. The anode and the cathode each have a current collector for electron conduction and a catalyst layer formed on the current collector. The proton conducting membrane is placed between the respective catalyst layers. Each catalyst layer is made of a mixture of a catalyst and a perfluoroalkylsulfonic acid polymer such as Nafion (trade name, manufactured by DuPont). The perfluoroalkylsulfonic acid polymer in each catalyst layer has high chemical stability and functions to hold the catalyst. It is also used as a component resin to form a proton conducting membrane serving as an electrolyte membrane. Each catalyst layer also has catalyst fine particles such as platinum or platinum-ruthenium particles having a particle size of a few nanometers, supported on carbon particles, in which the oxidation or reduction of methanol or oxidant (e.g., air) is carried out.

However, since the perfluoroalkylsulfonic acid resin has a cluster structure in which hydrophilic groups are clustered together, it can swell with the aqueous methanol solution. The swelling of the perfluoroalkylsulfonic acid resin causes blocking of passages for methanol diffusion so that methanol is inhibited from diffusing to and reaching the catalyst surface. It also causes degradation of the catalyst. In addition, the three-phase interface formed between the perfluoroalkylsulfonic acid resin phase, the catalyst phase and the fuel phase (methanol phase) is destroyed by the swelling of the resin so that the proton conductivity at the three-phase interface is reduced. Thus, there is the problem of reduction in cell output power and cell life.

BRIEF DESCRIPTION OF THE DRAWINGS

FIG. 3 is a graph showing the temperature dependence of the proton conductivity of a cast membrane made of a sheet-like organic compound of each of Synthesis Examples 1 to 8 and a cast membrane made of a perfluoroalkylsulfonic acid polymer of Comparative Example 1;

DETAILED DESCRIPTION

In general, according to one embodiment, there is provided a direct methanol fuel cell comprising: an anode to which an aqueous methanol solution is fed as a fuel, the anode having a current collector and a catalyst layer formed on the current collector; a cathode to which an oxidant is fed, the cathode having a current collector and a catalyst layer formed on the current collector; and an electrolyte membrane placed between the catalyst layer of the anode and the catalyst layer of the cathode, wherein at least the anode-side catalyst layer of the anode- and cathode-side catalyst layers comprises a catalyst and sheet-like organic compound consisting of a plurality of molecules having an aliphatic cyclic skeleton in which two carbon atoms are bonded to a cationic functional group and an anionic functional group, respectively, the sheet-like organic compound has a layered branch structure in which the molecules are layered by bonding different ions of the aliphatic cyclic skeleton to one another so that the molecules are displaced from one another, and a plurality of units each having the layered branch structure are present in the catalyst layer.

Figure 1:
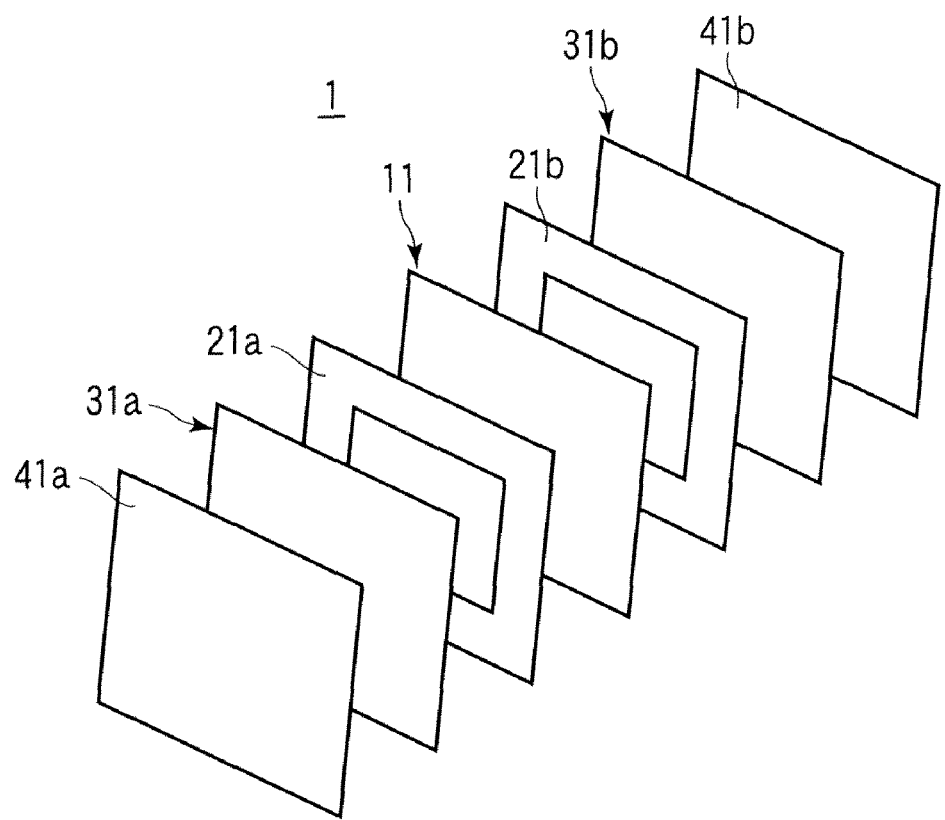
FIG. 1 is a schematic exploded perspective view showing a single fuel cell according to an embodiment of the invention.

Next, a direct methanol fuel cell according to an embodiment is specifically described with reference to FIGS. 1 and 2. FIG. 1 is a schematic exploded perspective view showing a single cell, and FIG. 2 is a cross-sectional view showing a membrane electrode unit incorporated in the single cell of FIG. 1.

As shown in FIG. 1, the single cell 1 includes a membrane electrode unit 11. A frame-shaped sealing member 21a, a fuel passage plate 31a, and a current collector plate 41a are arranged in this order and stacked on one side of the membrane electrode unit 11. Another frame-shaped sealing member 21b, an oxidizing gas passage plate 31b, and another current collector plate 41b are arranged in this order and stacked on the other side of the membrane electrode unit 11.

Figure 2:
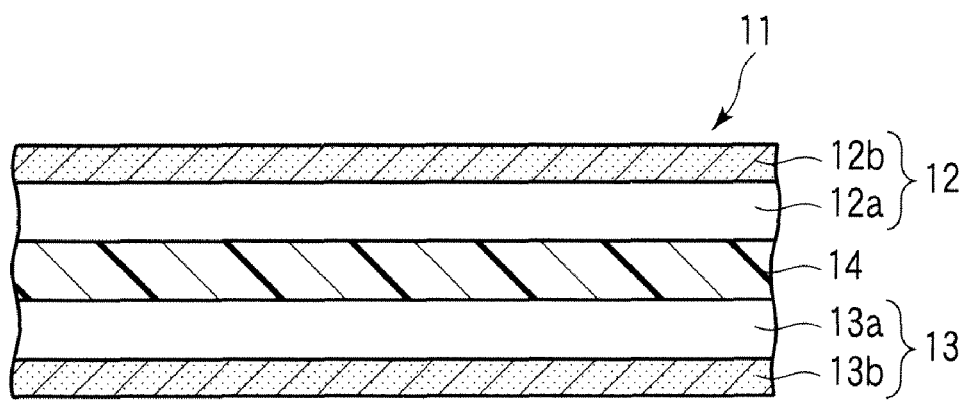
FIG. 2 is a cross-sectional view showing a membrane electrode unit incorporated in the single cell of FIG. 1.

As shown in FIG. 2, the membrane electrode 11 includes an anode 12 to which a fuel (aqueous methanol solution) is fed, a cathode 13 to which an oxidant is fed, and an electrolyte membrane 14 placed between the anode 12 and the cathode 13. The anode 12 includes a catalyst layer 12a to be in contact with the electrolyte membrane 14 and a current collector (diffusion layer) 12b on which the catalyst layer 12a is placed. For example, the current collector 12b is made of carbon paper. The cathode 13 includes a catalyst layer 13a to be in contact with the electrolyte membrane 14 and a current collector (diffusion layer) 13b on which the catalyst layer 13a is placed. For example, the current collector 13b is made of carbon paper.

The catalyst layer of the anode comprises a catalyst and sheet-like organic compound consisting of a plurality of molecules having an aliphatic cyclic skeleton in which two carbon atoms are bonded to a cationic functional group and an anionic functional group, respectively. The catalyst layer of the cathode may also comprise a catalyst and a sheet-like organic compound consisting of a plurality of molecules having an aliphatic cyclic skeleton in which two carbon atoms are bonded to a cationic functional group and an anionic functional group, respectively.

The cationic functional group is preferably ammonia, and the anionic functional group is preferably sulfonic acid.

The sheet-like organic compound consists of a plurality of molecules having an aliphatic cyclic skeleton and each molecule is preferably represented by formula (I) below.

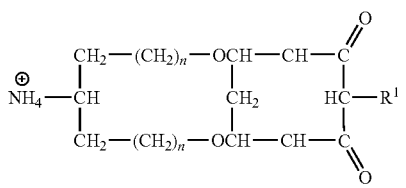

(I)

In formula (I), $R^1$ represents an aromatic functional group having the anionic functional group bonded thereto, and n represents an integer of 1 to 40.

For example, a benzyl group, a phenyl group or a naphthalene group is preferably incorporated in the aromatic functional group $R^1$ in formula (I), and the anionic functional group bonded to the functional group is preferably a sulfonic acid group.

In formula (I), n is more preferably from 1 to 25.

The sheet-like organic compound consisting of such a plurality of molecules has a layered branch structure in which the molecules are layered by bonding different ions of the aliphatic cyclic skeleton to one another so that the molecules are displaced from one another, and a plurality of units each having the layered branch structure are present in the catalyst layer. Specifically, the layered branch structure may be a structure in which a plurality of molecules are layered and displaced from one another in a stepwise manner.

For example, the catalyst has a structure in which catalyst fine particles are supported on carbon particles. For example, carbon powder with an average particle size of 0.005 to 0.08 μm, such as Ketjen Black (trade name, manufactured by Ketjen Black International Company) may be used for the carbon particles. For example, platinum-ruthenium fine particles may be used as the catalyst fine particles on the anode side. For example, platinum fine particles may be used as the catalyst fine particles on the cathode side. These catalyst fine particles are preferably finer than the carbon particles and, for example, preferably have an average particle size of 0.5 to 20 nm.

The catalyst layer described above is preferably formed on the current collector surface by the method described below.

First, the sheet-like organic compound consisting of a plurality of molecules having an aliphatic cyclic skeleton is dissolved in water, and a catalyst is added to the resulting aqueous solution and sufficiently stirred and mixed to form a catalyst paste. The catalyst paste is then supplied in two or more parts onto a current collector (e.g., a carbon paper sheet). The catalyst paste is applied to the current collector surface with a doctor blade and air-dried every time it is supplied. The process of supplying, applying and air-drying the catalyst paste is repeated so that a catalyst layer is formed on the current collector surface.

The viscosity of the catalyst paste is preferably from 300 mPa·s to 1,500 mPa·s.

The catalyst paste is preferably supplied in 3 to 10 parts, each of which corresponds to ⅓ to ⅒ of the final coating amount.

The coating speed (the relative speed between the current collector and the doctor blade) is preferably from 5 to 100 mm/minute, more preferably from 10 to 40 mm/minute.

When the catalyst layer is formed on the current collector surface as described above, the low-speed multiple application of the catalyst paste to the current collector surface makes it possible to form a plurality of layered branch structures in which molecules of the sheet-like organic compound, contained in the catalyst paste, are layered by bonding different ions of the aliphatic cyclic skeleton to one another so that the molecules are displaced from one another parallel to the current collector surface.

The direct methanol fuel cell according to the embodiment described above includes an anode and a cathode each having a current collector and a catalyst layer formed on the current collector, wherein at least the anode-side catalyst layer of the anode- and cathode-side catalyst layers comprises a catalyst and an organic compound consisting of a plurality of molecules having an aliphatic cyclic skeleton in which two carbon atoms are bonded to a cationic functional group and an anionic functional group, respectively. The sheet-like organic compound has a layered branch structure in which the molecules are layered by bonding different ions of the aliphatic cyclic skeleton to one another so that the molecules are displaced from one another, and a plurality of units each having the layered branch structure are present in the catalyst layer. Such a layered branch structure in the anode-side catalyst layer can prevent the catalyst layer from swelling with the aqueous methanol solution supplied. The prevention of the swelling of the catalyst layer leads to the prevention of degradation of the catalyst and makes smooth the diffusion and distribution of methanol to the catalyst, so that the production of hydrogen ions from methanol is promoted. The layered branch structure in the catalyst layer also functions as a hydrogen ion conducting path so that the supply of hydrogen ions to the electrolyte membrane can be increased. In addition, a three-phase interface can be stably formed among the phase of the sheet-like organic compound with the layered branch structure, the catalyst phase and the fuel phase (methanol phase), so that the proton conductivity can be improved at the three-phase interface.

Thus, there is provided a direct methanol fuel cell which makes possible an improvement of the output characteristics, a longer life, and operation in a wide temperature range from low temperature to high temperature.

The cathode-side catalyst layer may also comprise a catalyst and a sheet-like organic compound consisting of a plurality of molecules having an aliphatic cyclic skeleton in which two carbon atoms are bonded to a cationic functional group and an anionic functional group, respectively. The sheet-like organic compound also has a layered branch structure in which the molecules are layered by bonding different ions of the aliphatic cyclic skeleton to one another so that the molecules are displaced from one another, wherein a plurality of units each having the layered branch structure are present in the catalyst layer. According to this feature, there is provided a direct methanol fuel cell having an improved ability to diffuse oxygen in the cathode and having further improved output characteristics.

Examples of the invention are described below. It should be noted that hereinafter the term "parts" means "parts by weight".

Synthesis Example 1

Synthesis of Precursor

Thirty parts of N,N-dimethylformamide was added to a round-bottom reaction vessel equipped with an overhead stirrer and a Dimroth condenser. Thereafter, 2 parts of 1,5-dihydroxy-3-chloropentane, 3 parts of 1,7-dichloro-4-hydroxy-cyclooctane-3,5-dione and 0.1 parts of diazabicycloundecene (1,8-diazabicyclo[5.4.0]undec-7-ene) (DBU) were added in this order to the vessel and dissolved in the N,N-dimethylformamide. The reaction solution was stirred in a water bath at 15° C. for 2 hours. After the stirring, the reaction solution was taken out and added dropwise to 40 parts of acetone so that a precursor was precipitated. The resulting precursor was dissolved in 30 parts of ethanol and recrystallized in an ice bath. The precursor was purified by filtration with a paper filter and vacuum drying for 2 hours.

Amination of the Precursor

Thirty parts of N,N-dimethylformamide was added to a round-bottom reaction vessel equipped with an overhead stirrer and a Dimroth condenser. After 2 parts of the resulting precursor was dissolved therein, 2 parts of aqueous ammonia was added thereto. The reaction solution was stirred in a draft chamber at room temperature for 2 hours. The reaction solution was neutralized with 0.1 N hydrochloric acid, while the pH was observed with pH test paper. Thereafter, 10 parts of acetone was added dropwise so that an aminated precursor was precipitated. The resulting precipitate was subjected to suction filtration with a paper filter to collect the aminated precursor. The aminated precursor was vacuum-dried for 2 hours.

Benzylsulfonation of the Aminated Precursor

The resulting aminated precursor was added to a round-bottom reaction vessel equipped with an overhead stirrer and a Dimroth condenser. Thirty parts of N,N-dimethylformamide, 4 parts of 4-chlorobenzenesulfonic acid and 0.1 parts of DBU were each further added to form a reaction solution, which was stirred in a water bath for 2 hours. Aqueous ammonia was added, while the pH was checked with pH test paper, and the addition was stopped when the solution was neutralized.

Twenty parts of acetone was added to the reaction solution so that the desired compound was precipitated. The compound was subjected to suction filtration with a paper filter and then to vacuum drying for 2 hours so that the synthesis of the organic compound was completed.

The resulting organic compound was identified as a sheet-like organic compound consisting of a plurality of molecules represented by structural formula (A) below on the basis of the 1H-NMR spectral data below, the 13C-NMR spectral data below, and the infrared spectral data below obtained by infrared analysis.

1H-NMR spectral data (DMSO-d6) [ppm]: 1.4, 2.3, 3.6, 3.9, 4.3, 4.7, 5.2, 5.8, 7.8.

13C-NMR spectral data (DMSO-d6) [ppm]: 135, 140.

Infrared spectral data [cm$^{-1}$]: 890 (C—H), 952 (C—H), 1005 (C—O—C), 1120 (C—O—C), 1750 (C=O), 3040 (phenyl), 3300 (N—H).

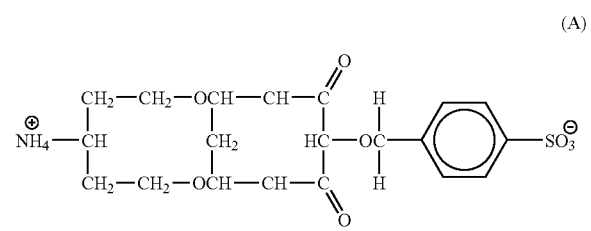

(A)

Synthesis Example 2

An organic compound was synthesized using the process of Synthesis Example 1, except that benzenesulfonic acid was used in place of 4-chlorobenzenesulfonic acid in the sulfonation of the aminated precursor.

The resulting organic compound was identified as a sheet-like organic compound consisting of a plurality of molecules represented by structural formula (B) below on the basis of the 1H-NMR spectral data below, the 13C-NMR spectral data below, and the infrared spectral data below obtained by infrared analysis.

1H-NMR spectral data (DMSO-d6) [ppm]: 1.5, 2.4, 3.7, 4.0, 4.3, 4.8, 5.2, 7.8.

13C-NMR spectral data (DMSO-d6) [ppm]: 136, 142.

Infrared spectral data [cm$^{-1}$]: 870 (C—H), 952 (C—H), 1010 (C—O—C), 1145 (C—O—C), 1780 (C=O), 3050 (phenyl), 3360 (N—H).

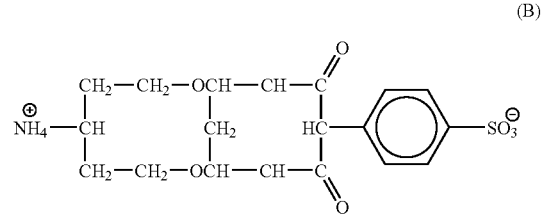

(B)

Synthesis Example 3

An organic compound was synthesized using the process of Synthesis Example 1, except that 1,7-dihydroxy-4-chloroheptane was used in place of 1,5-dihydroxy-3-chloropentane in the synthesis of the precursor and that naphthalenesulfonic acid was used in place of 4-chlorobenzenesulfonic acid in the sulfonation of the aminated precursor.

The resulting organic compound was identified as a sheet-like organic compound consisting of a plurality of molecules represented by structural formula (C) below on the basis of the 1H-NMR spectral data below, the 13C-NMR spectral data below, and the infrared spectral data below obtained by infrared analysis.

1H-NMR spectral data (DMSO-d6) [ppm]: 1.6, 2.6, 3.8, 4.1, 4.5, 4.8, 5.4, 7.9.

13C-NMR spectral data (DMSO-d6) [ppm]: 140, 143.

Infrared spectral data [cm$^{-1}$]: 874 (C—H), 965 (C—H), 1014 (C—O—C), 1150 (C—O—C), 1793 (C=O), 3065 (phenyl), 3384 (N—H).

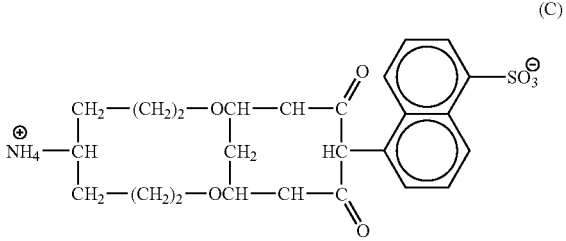

(C)

Synthesis Example 4

An organic compound was synthesized using the process of Synthesis Example 1, except that 1,9-dihydroxy-5-chlorononane was used in place of 1,5-dihydroxy-3-chloropentane in the synthesis of the precursor.

The resulting organic compound was identified as a sheet-like organic compound consisting of a plurality of molecules represented by structural formula (D) below on the basis of the 1H-NMR spectral data below, the 13C-NMR spectral data below, and the infrared spectral data below obtained by infrared analysis.

1H-NMR spectral data (DMSO-d6) [ppm]: 1.4, 2.3, 3.6, 3.9, 4.3, 4.7, 5.2, 5.8, 7.8.

13C-NMR spectral data (DMSO-d6) [ppm]: 135, 140.

Infrared spectral data [cm$^{-1}$]: 890 (C—H), 952 (C—H), 1005 (C—O—C), 1120 (C—O—C), 1750 (C=O), 3040 (phenyl), 3300 (N—H).

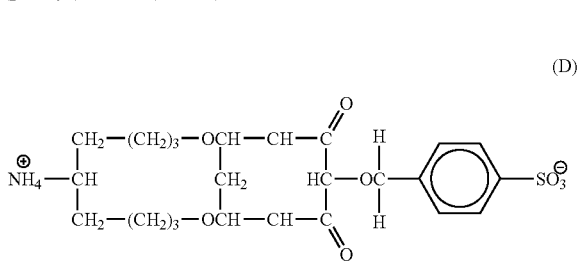

(D)

Synthesis Example 5

An organic compound was synthesized using the process of Synthesis Example 1, except that 1,15-dihydroxy-8-chloropentadecane was used in place of 1,5-dihydroxy-3-chloropentane in the synthesis of the precursor.

The resulting organic compound was identified as a sheet-like organic compound consisting of a plurality of molecules represented by structural formula (E) below on the basis of the 1H-NMR spectral data below, the 13C-NMR spectral data below, and the infrared spectral data below obtained by infrared analysis.

1H-NMR spectral data (DMSO-d6) [ppm]: 1.4, 2.3, 3.6, 3.9, 4.3, 4.7, 5.2, 5.8, 7.8.

13C-NMR spectral data (DMSO-d6) [ppm]: 135, 140.

Infrared spectral data [cm$^{-1}$]: 890 (C—H), 952 (C—H), 1005 (C—O—C), 1120 (C—O—C), 1750 (C=O), 3040 (phenyl), 3300 (N—H).

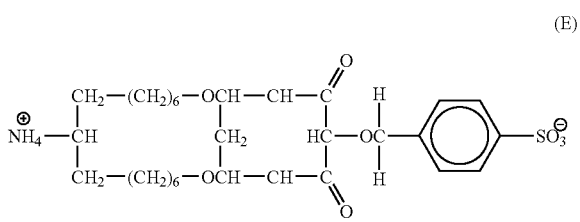

(E)

Synthesis Example 6

An organic compound was synthesized using the process of Synthesis Example 1, except that 1,19-dihydroxy-10-chlorononadecane was used in place of 1,5-dihydroxy-3-chloropentane in the synthesis of the precursor and that benzenesulfonic acid was used in place of 4-chlorobenzenesulfonic acid in the sulfonation of the aminated precursor.

The resulting organic compound was identified as a sheet-like organic compound consisting of a plurality of molecules represented by structural formula (F) below on the basis of the 1H-NMR spectral data below, the 13C-NMR spectral data below, and the infrared spectral data below obtained by infrared analysis.

1H-NMR spectral data (DMSO-d6) [ppm]: 1.5, 2.4, 3.7, 4.0, 4.3, 4.8, 5.2, 7.8.

13C-NMR spectral data (DMSO-d6) [ppm]: 136, 142.

Infrared spectral data [cm$^{-1}$]: 870 (C—H), 952 (C—H), 1010 (C—O—C), 1145 (C—O—C), 1780 (C=O), 3050 (phenyl), 3360 (N—H).

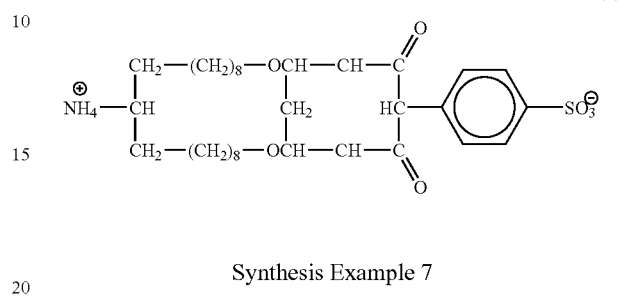

(F)

Synthesis Example 7

An organic compound was synthesized using the process of Synthesis Example 1, except that 1,35-dihydroxy-22-chloropentatriacontane was used in place of 1,5-dihydroxy-3-chloropentane in the synthesis of the precursor and that naphthalenesulfonic acid was used in place of 4-chlorobenzenesulfonic acid in the sulfonation of the aminated precursor.

The resulting organic compound was identified as a sheet-like organic compound consisting of a plurality of molecules represented by structural formula (G) below on the basis of the 1H-NMR spectral data below, the 13C-NMR spectral data below, and the infrared spectral data below obtained by infrared analysis.

1H-NMR spectral data (DMSO-d6) [ppm]: 1.6, 2.6, 3.8, 4.1, 4.5, 4.8, 5.4, 7.9.

13C-NMR spectral data (DMSO-d6) [ppm]: 140, 143.

Infrared spectral data [cm$^{-1}$]: 874 (C—H), 965 (C—H), 1014 (C—O—C), 1150 (C—O—C), 1793 (C=O), 3065 (phenyl), 3384 (N—H).

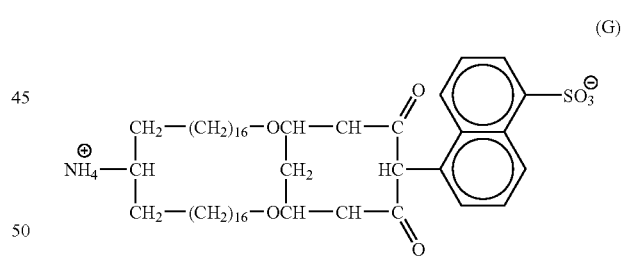

(G)

Synthesis Example 8

An organic compound was synthesized using the process of Synthesis Example 1, except that 1,43-dihydroxy-22-chlorotritetracontane was used in place of 1,5-dihydroxy-3-chloropentane in the synthesis of the precursor.

The resulting organic compound was identified as a sheet-like organic compound consisting of a plurality of molecules represented by structural formula (H) below on the basis of the 1H-NMR spectral data below, the 13C-NMR spectral data below, and the infrared spectral data below obtained by infrared analysis.

1H-NMR spectral data (DMSO-d6) [ppm]: 1.4, 2.3, 3.6, 3.9, 4.3, 4.7, 5.2, 5.8, 7.8.

13C-NMR spectral data (DMSO-d6) [ppm]: 135, 140.

Infrared spectral data [cm$^{-1}$]: 892 (C—H), 954 (C—H), 1012 (C—O—C), 1132 (C—O—C), 1760 (C=O), 3060 (phenyl), 3300 (N—H).

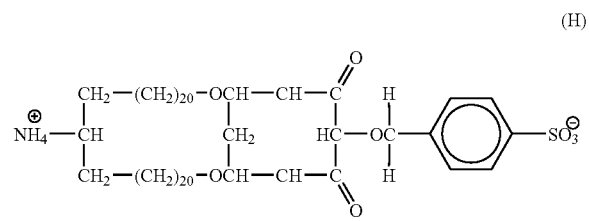

(H)

Evaluation of Proton Conductivity

Preparation of Cast Membrane

Thirty parts of the sheet-like organic compound obtained in each of Synthesis Examples 1 to 8 was dissolved in 70 parts of water and stirred and mixed to form a solution with a viscosity of 500 mPa. Each solution was applied in an amount of ⅓ of the final coating amount to a carbon paper sheet. After it is air-dried, the process of applying and air-drying the catalyst paste under the same conditions is repeated twice, so that the application process was performed three times in total.

Each resulting cast membrane was separated from the release film with tweezers and stored.

An aqueous solution of 5% by weight of a perfluoroalkyl-sulfonic acid polymer (Nafion (trade name), manufactured by DuPont) was spread on a glass plate with a bar coater, and the resulting cast membrane as Comparative Example 1 was separated from the glass plate and stored.

Preparation of Cell for Use in Electric Conductivity Measurement (a-1) Two fluororesin plates each made of polytetrafluoroethylene and having a 0.5 cm-wide, 1.0 cm-long, 1.0 cm-deep liquid-reservoir through hole at the center were prepared. A 0.30 mm-thick platinum foil was cut into 0.5 cm×2.0 cm pieces for use as electrodes. The electrode was attached with a double-sided adhesive tape to the 0.5 cm side of the liquid reservoir of each fluororesin plate in such a manner that the edge (0.5 cm) of the electrode precisely coincided with the side. A protective tape was attached to part of the electrode surface in the area from the position 0.7 cm apart from one end of the liquid reservoir to the other and so that the electrode area was set to 0.35 cm$^2$.

(a-2) The surface of the platinum electrode was plated with platinum black by the procedure described below. A plating solution was prepared by dissolving 0.008 g of lead acetate (Pb(CH$_3$COO)$_2$.3H$_2$O) and 1 g of platinic chloride (H$_2$PtCl$_{16}$.6H$_2$O) in 30 mL of ¹⁄₄₀ N hydrochloric acid. The platinum electrode-carrying fluororesin plates prepared in the section (a-1) were immersed one by one in the plating solution, and a direct voltage-current generator (R1644 (trade name) manufactured by ADVANTEST CORPORATION) was set to the following conditions: bath voltage, 3.0 V; current, 14 mA; current density, 40 mA/cm$^2$. Subsequently, the electrodes were changed between + and − by exchanging the + and − setting switches of the generator at intervals of about 1 minute so that two electrodes could be alternately plated little by little. This process was continued for 50 minutes. The two electrodes were then washed with distilled water. In 10% dilute sulfuric acid, the platinum black electrode plate was set −, while another new platinum electrode plate was set +, and a voltage of 3 V was applied for 10 minutes so that the plating solution and the adsorbed chlorine were removed. Finally, the electrodes were thoroughly washed with distilled water and stored in distilled water.

(b) The cast membrane made of the organic compound of each of Synthesis Examples 1 to 8 was cut into a size of 15 mm×12 mm to form a measurement membrane for use in the measurement of the electric conductivity by the alternating current method (call-call plotting). The measurement membrane was then placed on the liquid reservoir of the first fluororesin plate having holes at four corners and having the platinum electrode partially plated with platinum black by the method described above so that the platinum black-plated part could be covered with the measurement membrane. The second fluororesin plate having holes at four corners and having the platinum electrode partially plated with platinum black in the same manner was placed on the first fluororesin plate in such a manner that their liquid reservoirs coincide with each other, the platinum electrode of the second plate extended in a direction opposite to the platinum electrode of the first plate, and the platinum black-plated part was in contact with the measurement membrane. Therefore, the measurement membrane was sandwiched between the first and second fluororesin plates. A bolt was inserted into each of the holes at the four corners of the first and second fluororesin plates and screwed into a nut so that the first and second fluororesin plates were fixed to each other. About 0.3 mL of an aqueous 0.03 N hydrochloric acid solution was added to the liquid reservoirs of the first and second fluororesin plates with the aid of capillarity, and the aqueous hydrochloric acid solution was allowed to spread over the both surfaces of the measurement membrane, so that an electrical conductivity measurement cell was obtained.

Similarly, the cast membrane made of the perfluoroalkyl-sulfonic acid polymer as Comparative Example 1 was cut into a size of 15 mm×12 mm to form a measurement membrane for use in the measurement of the electrical conductivity by the alternating current method (call-call plotting), and the measurement membrane was sandwiched between the first and second fluororesin plates. About 0.3 mL of an aqueous 0.03 N hydrochloric acid solution was added to the liquid reservoirs, and the aqueous hydrochloric acid solution was allowed to spread over the both surfaces of the measurement membrane, so that another measurement cell was obtained.

Each resulting measurement cell was then fixed to a stand, and each platinum electrode was connected to a Solatron impedance/gain-face analyzer SI1260. An alternating current was applied to the measurement membrane, while the frequency of the current was reduced from the high frequency side to the low frequency side. The resistance at this time was plotted on a real number axis and imaginary number axis (call-call plotting). In this case, the graph generally forms a semicircle on the high frequency side and then forms an upward sloping line on the low frequency side. The diameter of this semicircle represents the resistance of the sample. In this measurement, the radius of this semicircle was estimated, and the resulting value was used to calculate the electrical conductivity of the measurement membrane so that the resistance of the membrane was determined. The current flowing distance in the membrane is 0.5 cm as structurally specified. Therefore, the electrical conductivity of the membrane is calculated according to the following formula (1): Proton conductivity (W$^{-1}$·cm$^{-1}$)=distance between electrodes/[membrane cross-section area×membrane resistance]=0.5 (cm)/[membrane width 1.0 (cm)×membrane thickness (cm)×membrane resistance (W)] (1).

FIG. 3 shows the temperature dependence of the proton conductivity determined using each of the measurement cells of Examples 1 to 8 and Comparative Example 1.

FIG. 3 shows that the cast membrane made of the sheet-like organic compound of each of Synthesis Examples 1 to 8 exhibits higher proton conductivity in the low temperature region than the cast membrane made of the perfluoroalkylsulfonic acid polymer of Comparative Example 1, so that the proton conductivity is significantly improved.

Example 1

Preparation of Anode

A three-neck separable glass flask was placed in the space of a draft chamber DFV-12T manufactured by DALTON CO., LTD. The ports of the separable flask were equipped with a nitrogen introducing tube, Polytron (registered trademark) Homogenizer PT3100 and a nitrogen discharging tube, respectively. The homogenizer PT3100 was equipped with a stirring rod in such a manner that its front end reached the interior of the separable flask. A silicon tube was connected to the nitrogen discharging tube, and the front end of the tube was attached to a 500 mL bubbling unit so that volatile components discharged from the separable flask could be trapped. According to this procedure, a stirring system was assembled.

Five parts of the sheet-like organic compound obtained in Synthesis Example 1 was dissolved in 100 parts of water to form an aqueous 5% solution. Ten parts of platinum-ruthenium-carrying carbon powder was dispersed in the resulting aqueous solution to form a catalyst slurry. The resulting catalyst slurry was then placed in the stirring system-equipped separable flask and stirred at a rate of 300 rpm. The stirring was stopped at intervals of 30 minutes, while the viscosity of the catalyst slurry was measured with a viscometer SVISCOSTICK manufactured by VISCOTECH CO., LTD., and the stirring was continued until the viscosity fell within the range of 300 mPa·s to 1,500 mPa·s. The stirring was stopped at the time when the viscosity fell within the desired range, so that a catalyst paste was obtained.

A coating machine (IMC-7023, manufactured by IMOTO SEISAKUSHO) equipped with two doctor blades was used. The doctor blades used were round doctor blades manufactured by ECO BLADE and having a 10 μm fluororesin surface coating. The two doctor blades were arranged perpendicular to a release film and opposed to each other with a gap of 0.4 mm therebetween. The release film was a polyethylene terephthalate (PET) film, which was fed from a supply unit to a take-up unit.

A carbon paper sheet (TGP-H-030, manufactured by TORAY INDUSTRIES, INC.) was fixed on the release film, and the previously prepared catalyst paste was supplied in an amount of ⅓ of the final coating amount onto the carbon paper sheet. While the release film was fed by driving the take-up unit, the catalyst paste was applied to the carbon paper sheet with the doctor blades at a rate of 20 mm/minute. After air drying, the process of applying and air-drying the catalyst paste under the same conditions was repeated twice. The coating process was performed three times in total so that a catalyst layer was formed on the carbon paper sheet and therefore an anode was obtained. The coating amount of the platinum-ruthenium-carrying carbon powder on the carbon paper sheet was 1 mg/cm². The contents of the carbon paper, the sheet-like organic compound and the platinum-ruthenium-carrying carbon powder in the catalyst layer were 55% by weight, 40% by weight, and 5% by weight, respectively.

Preparation of Cathode

Five parts of the sheet-like organic compound obtained in Synthesis Example 1 was dissolved in 100 parts of water to form an aqueous 5% solution. Ten parts of platinum-carrying carbon powder was dispersed in the resulting aqueous solution to form a catalyst slurry. The resulting catalyst slurry was then placed in the stirring system-equipped separable flask and stirred at a rate of 300 rpm. The stirring was stopped at intervals of 30 minutes, while the viscosity of the catalyst slurry was measured with a viscometer SVISCOSTICK manufactured by VISCOTECH CO., LTD., and the stirring was continued until the viscosity fell within the range of 300 mPa·s to 1,500 mPa·s. The stirring was stopped at the time when the viscosity fell within the desired range, so that a catalyst paste was obtained.

A carbon paper sheet (TGP-H-030, manufactured by TORAY INDUSTRIES, INC.) was fixed on the release film, and the previously prepared catalyst paste was supplied in an amount of ⅓ of the final coating amount onto the carbon paper sheet. While the release film was fed by driving the take-up unit, the catalyst paste was applied to the carbon paper sheet with the doctor blades at a rate of 20 mm/minute. After air drying, the process of applying and air-drying the catalyst paste under the same conditions was repeated twice. The coating process was performed three times in total so that a catalyst layer was formed on the carbon paper sheet and therefore a cathode was obtained. The coating amount of the platinum-carrying carbon powder on the carbon paper sheet was 1 mg/cm². The contents of the carbon paper, the sheet-like organic compound and the platinum-carrying carbon powder in the catalyst layer were 55% by weight, 35% by weight, and 10% by weight, respectively.

Preparation of Separator

A 4 mm-thick carbon plate was formed into a serpentine shape by cutting so that 4 mm-wide, 2 mm-deep passages were formed.

Preparation of Membrane Electrode

A polymer electrolyte membrane (Nafion (registered trademark) 115, manufactured by DuPont) was placed between the resulting anode and cathode so as to be in contact with the catalyst layers of the anode and cathode. The laminate was sandwiched between two PET sheets. The laminate with the two PET sheets was then hot-pressed at 110° C. for 2 minutes under a load of 2 MPa using a hot press machine (Die-Set Heater Press MKP-150D-WH, manufactured by MIKADO TECHNOS CO., LTD.). In the same hot press machine, hot pressing was further performed at 120° C. for 2 minutes under a load of 4 MPa. The PET sheets were then separated so that a membrane electrode was obtained.

Incorporation into Single Cell

The resulting membrane electrode (5 cm² in electrode area) was sandwiched between the two previously prepared separators and clamped to form a single cell for evaluation.

Example 2

A cell for evaluation was constructed using the process of Example 1, except that the sheet-like organic compound obtained in Synthesis Example 2 was used in the process of forming the catalyst layers of the anode and the cathode. The contents of the carbon paper, the sheet-like organic compound and the platinum-ruthenium-carrying carbon powder in the catalyst layer of the anode were 55% by weight, 35% by weight, and 10% by weight, respectively. The contents of the carbon paper, the sheet-like organic compound and the platinum-carrying carbon powder in the catalyst layer of the cathode were 55% by weight, 35% by weight, and 10% by weight, respectively.

Example 3

A cell for evaluation was constructed using the process of Example 1, except that the sheet-like organic compound obtained in Synthesis Example 3 was used in the process of forming the catalyst layers of the anode and the cathode. The contents of the carbon paper, the sheet-like organic compound and the platinum-ruthenium-carrying carbon powder in the catalyst layer of the anode were 60% by weight, 25% by weight, and 15% by weight, respectively. The contents the carbon paper, the sheet-like organic compound and the platinum-carrying carbon powder in the catalyst layer of the cathode were 60% by weight, 25% by weight, and 15% by weight, respectively.

Example 4

A cell for evaluation was constructed using the process of Example 1, except that the sheet-like organic compound obtained in Synthesis Example 4 was used in the process of forming the catalyst layers of the anode and the cathode. The contents of the carbon paper, the sheet-like organic compound and the platinum-ruthenium-carrying carbon powder in the catalyst layer of the anode were 55% by weight, 20% by weight, and 25% by weight, respectively. The contents of the carbon paper, the sheet-like organic compound and the platinum-carrying carbon powder in the catalyst layer of the cathode were 62% by weight, 13% by weight, and 25% by weight, respectively.

Example 5

A cell for evaluation was constructed using the process of Example 1, except that the sheet-like organic compound obtained in Synthesis Example 5 was used in the process of forming the catalyst layers of the anode and the cathode. The contents of the carbon paper, the sheet-like organic compound and the platinum-ruthenium-carrying carbon powder in the catalyst layer of the anode were 57% by weight, 15% by weight, and 28% by weight, respectively. The contents of the carbon paper, the sheet-like organic compound and the platinum-carrying carbon powder in the catalyst layer of the cathode were 62% by weight, 10% by weight, and 28% by weight, respectively.

Example 6

A cell for evaluation was constructed using the process of Example 1, except that the sheet-like organic compound obtained in Synthesis Example 6 was used in the process of forming the catalyst layers of the anode and the cathode. The contents of the carbon paper, the sheet-like organic compound and the platinum-ruthenium-carrying carbon powder in the catalyst layer of the anode were 40% by weight, 25% by weight, and 35% by weight, respectively. The contents of the carbon paper, the sheet-like organic compound and the platinum-carrying carbon powder in the catalyst layer of the cathode were 40% by weight, 25% by weight, and 35% by weight, respectively.

Example 7

A cell for evaluation was constructed using the process of Example 1, except that the sheet-like organic compound obtained in Synthesis Example 7 was used in the process of forming the catalyst layers of the anode and the cathode. The contents of the carbon paper, the sheet-like organic compound and the platinum-ruthenium-carrying carbon powder in the catalyst layer of the anode were 85% by weight, 5% by weight, and 10% by weight, respectively. The contents of the carbon paper, the sheet-like organic compound and the platinum-carrying carbon powder in the catalyst layer of the cathode were 85% by weight, 5% by weight, and 10% by weight, respectively.

Example 8

A cell for evaluation was constructed using the process of Example 1, except that the sheet-like organic compound obtained in Synthesis Example 8 was used in the process of forming the catalyst layers of the anode and the cathode. The contents of the carbon paper, the sheet-like organic compound and the platinum-ruthenium-carrying carbon powder in the catalyst layer of the anode were 47% by weight, 3% by weight, and 50% by weight, respectively. The contents of the carbon paper, the sheet-like organic compound and the platinum-carrying carbon powder in the catalyst layer of the cathode were 47% by weight, 3% by weight, and 50% by weight, respectively.

Comparative Example 2

A slurry was prepared by stirring 100 parts of a 5% perfluoroalkylsulfonic acid polymer (Nafion (trade name), manufactured by DuPont) solution and 2 parts of platinum-ruthenium-carrying carbon powder. A catalyst layer was formed by applying the resulting slurry to a carbon paper sheet (TGP-H-030, manufactured by TORAY INDUSTRIES, INC.) with a coater in such a manner that the platinum-ruthenium was carried in an amount of 1 mg/cm$^2$. As a result, an anode was obtained. The contents of the carbon paper, Nafion and the platinum-ruthenium-carrying carbon powder in the catalyst layer were 40% by weight, 30% by weight, and 30% by weight, respectively.

Another slurry was prepared by stirring 100 parts of a 5% perfluoroalkylsulfonic acid polymer (Nafion (trade name), manufactured by DuPont) solution and 2 parts of platinum-carrying carbon powder. A cathode was formed by applying the resulting slurry to a carbon paper sheet (TGP-H-030, manufactured by TORAY INDUSTRIES, INC.) with a coater in such a manner that the platinum was carried in an amount of 1 mg/cm$^2$. The contents of the carbon paper, Nafion and the platinum-ruthenium-carrying carbon powder in the catalyst layer were 40% by weight, 30% by weight, and 20% by weight, respectively.

A single cell for evaluation was constructed using the process of Example 1, except that the resulting anode and cathode were used.

The single cells of Examples 1 to 8 and Comparative Example 2 were each connected to a fuel cell evaluation system. An aqueous 3% by weight methanol solution (fuel) was fed at a flow rate of mL/minute to the anode-side separator of each single cell, and air was fed at a flow rate of 10 mL/minute to the cathode-side separator of each single cell, while the current-voltage characteristics of each single cell were measured at 50° C. The results are shown in FIG. 4.

Figure 4:
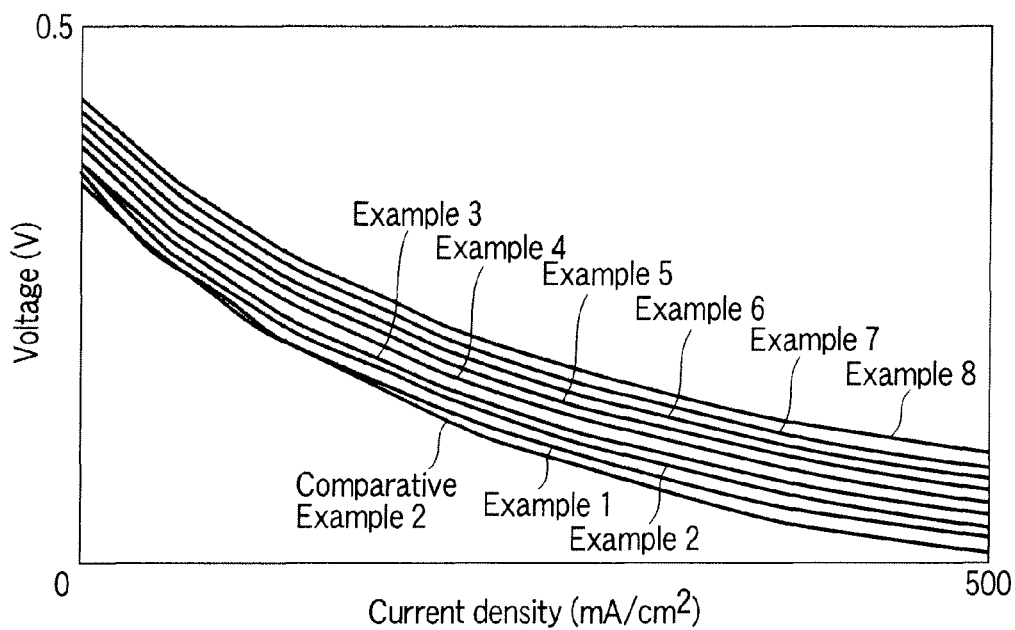
FIG. 4 is a graph showing current-voltage curves of the single cells of Examples 1 to 8 and Comparative Example 2.

FIG. 4 shows that the single cells of Examples 1 to 8 each output a higher voltage than the single cell of Comparative Example 2.

An aqueous 3% by weight methanol solution (fuel) was fed at a flow rate of 5 mL/minute to the anode-side separator of each single cell, and air was fed at a flow rate of 10 mL/minute to the cathode-side separator of each single cell, while electrical potential changes were observed during 1,000-hour operation at a temperature of 50° C. with the current density kept constant at 100 mA/cm². The results are shown in FIG. 5.

Figure 5:
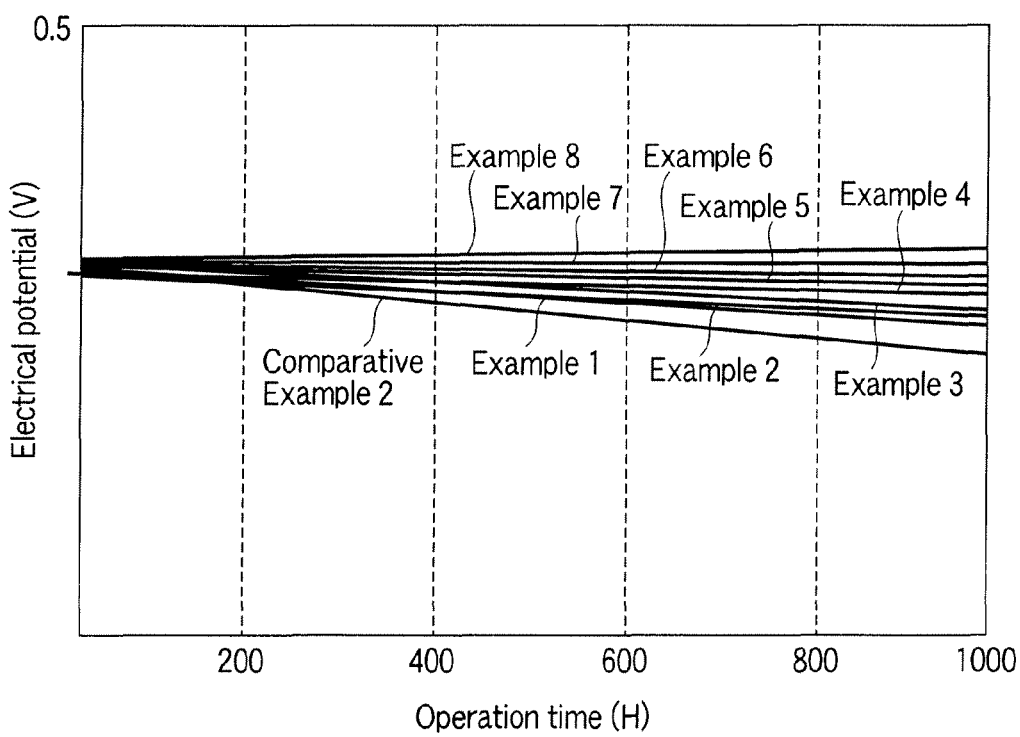
FIG. 5 is a graph showing changes in electrical potential of the single cell of each of Examples 1 to 8 and Comparative Example 2 during long-term operation with the current density kept constant.

FIG. 5 shows that the single cells of Examples 1 to 8 each exhibit a higher electrical potential retention rate even after long-term operation and generate electric power with a higher degree of reliability than the single cell of Comparative Example 2.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A direct methanol fuel cell comprising:
an anode to which an aqueous methanol solution is fed as a fuel, the anode having a current collector and a catalyst layer formed on the current collector;
a cathode to which an oxidant is fed, the cathode having a current collector and a catalyst layer formed on the current collector; and
an electrolyte membrane placed between the catalyst layer of the anode and the catalyst layer of the cathode,
wherein at least the anode catalyst layer of the anode and cathode catalyst layers comprises a catalyst and organic compounds consisting of a plurality of molecules represented by formula (I) below, which has a cationic functional group and an anionic functional group,
each of the organic compounds has a layered branch structure in which molecules of formula (I) are layered by bonding different ions of each molecule to one another so that the molecules are displaced from one another,

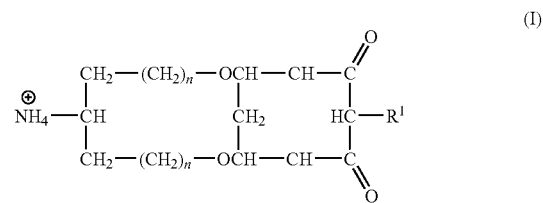

(I)

where R¹ represents an aromatic functional group having the anionic functional group bonded thereto, and n represents an integer of 1 to 40.

2. The direct methanol fuel cell according to claim 1, wherein the aromatic functional group R¹ incorporated in formula (I) is a benzyl group, a phenyl group or a naphthalene group, and the anionic functional group bonded to the aromatic functional group is a sulfonic acid group.

* * * * *